United States Patent
Matsui et al.

(10) Patent No.: US 9,309,447 B2
(45) Date of Patent: Apr. 12, 2016

(54) METHOD FOR RECOVERY OF CERIUM OXIDE

(71) Applicant: SHIN-ETSU CHEMICAL CO., LTD., Tokyo (JP)

(72) Inventors: Harunobu Matsui, Joetsu (JP); Daijitsu Harada, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 392 days.

(21) Appl. No.: 13/717,905

(22) Filed: Dec. 18, 2012

(65) Prior Publication Data

US 2013/0152483 A1 Jun. 20, 2013

(30) Foreign Application Priority Data

Dec. 19, 2011 (JP) ................................. 2011-276669

(51) Int. Cl.
| | | |
|---|---|---|
| B24B 57/00 | (2006.01) | |
| C09C 1/68 | (2006.01) | |
| C09K 3/14 | (2006.01) | |
| B03D 3/00 | (2006.01) | |
| B01D 21/01 | (2006.01) | |
| C02F 1/52 | (2006.01) | |
| C01F 17/00 | (2006.01) | |
| C09G 1/02 | (2006.01) | |
| B24B 1/00 | (2006.01) | |
| B24B 7/19 | (2006.01) | |
| B24D 3/02 | (2006.01) | |
| B01D 21/00 | (2006.01) | |
| C02F 1/00 | (2006.01) | |

(52) U.S. Cl.
CPC ........... C09K 3/1409 (2013.01); C01F 17/0043 (2013.01); C09G 1/02 (2013.01)

(58) Field of Classification Search
CPC ........ C01F 17/00; C01F 17/0043; C02F 1/66; C02F 1/56; C02F 1/5236; C02F 1/5245; C02F 9/00; C09K 3/1409; C09K 3/14; C09G 1/02; B24B 57/00; B24B 57/02; B24B 57/04; B03D 2201/00; B03D 2201/007
USPC ......... 210/702, 723, 724, 726, 749, 767, 770, 210/772; 51/309; 423/21.1, 263; 451/41, 451/60, 446; 209/155
See application file for complete search history.

(56) References Cited

U.S. PATENT DOCUMENTS

| | | | |
|---|---|---|---|
| 4,663,137 A * | 5/1987 | Chane-Ching et al. | ........ 423/263 |
| 5,728,355 A | 3/1998 | Asada | |
| 2006/0150526 A1* | 7/2006 | Ota et al. | ......................... 51/307 |
| 2010/0044625 A1* | 2/2010 | Nho et al. | ...................... 423/263 |

FOREIGN PATENT DOCUMENTS

| | | | | |
|---|---|---|---|---|
| JP | 11-090825 A | | 4/1999 | |
| JP | 11090825 A | * | 4/1999 | ............. B24B 57/02 |
| JP | 2002-028662 A | | 1/2002 | |
| JP | 2002028662 A | * | 1/2002 | ................ C02F 1/52 |
| JP | 2003-034526 A | | 2/2003 | |
| JP | 2003-205460 A | | 7/2003 | |
| JP | 2004-237163 A | | 8/2004 | |
| JP | 2004237163 A | * | 8/2004 | ............. C02F 11/14 |
| JP | 2007-276055 A | | 10/2007 | |
| RO | 80596 A2 | | 11/1982 | |
| WO | 2011/099596 A1 | | 8/2011 | |

OTHER PUBLICATIONS

English Translation of Fujita (JP 2002-028662) "Method of recovering cerium oxide from waste liquid of cerium oxide polishing agent for optical polishing", published Jan. 29, 2002.*
English Translation of Matsubara (JP 2004-237163) "Method for the reuse of cerium oxide abrasive material", published Aug. 26, 2004.*
Full translation of Kato, et al. (JP #11090825A); pp. 1-7.*
Office Action dated Aug. 26, 2014, issued in corresponding Japanese Patent Application No. 2011-276669 (2 pages).
Extended European Search Report dated Feb. 25, 2014, issued in corresponding European application No. 12197351.5 (5 pages).

* cited by examiner

*Primary Examiner* — Nam Nguyen
*Assistant Examiner* — Clare Perrin
(74) *Attorney, Agent, or Firm* — Westerman, Hattori, Daniels & Adrian, LLP

(57) ABSTRACT

A method for recovery of cerium oxide from the abrasive waste composed mainly of cerium oxide arising from the polishing of glass substrates, said method including the steps of (i) adding to the abrasive waste an aqueous solution of a basic substance; (ii) adding to the resulting solution a precipitant, thereby forming precipitates composed mainly of cerium oxide, and removing the supernatant liquid; (iii) adding to the resulting precipitates a solution of an acid substance, thereby making said precipitate slightly acid to neutral; (iv) washing the precipitates with an organic solvent; and (v) drying and crushing the precipitates. The method males it possible to recycle abrasive waste into a pure abrasive composed mainly of cerium oxide which can be reused to polish synthetic quartz glass substrates for state-of-the-art semiconductor technology relating to photomasks and reticles.

6 Claims, No Drawings

METHOD FOR RECOVERY OF CERIUM OXIDE

CROSS-REFERENCE TO RELATED APPLICATION

This non-provisional application claims priority under 35 U.S.C. §119(a) on Patent Application No. 2011-276669 filed in Japan on Dec. 19, 2011, the entire contents of which are hereby incorporated by reference.

TECHNICAL FIELD

The present invention relates to a method for recovery of cerium oxide from the abrasive waste composed mainly of cerium oxide arising from the polishing of synthetic quartz glass substrates to be used as an electronic material related to semiconductors.

BACKGROUND ART

It is common practice in the field of semiconductor and optics to polish glass substrates with an abrasive containing rare earth elements composed mainly of cerium oxide and additionally of yttrium oxide and neodymium oxide in small amounts. Unfortunately, Japan is limited in the yield of minerals containing rare earth elements for abrasive and she relies mostly on import for their supply. In view of the current international situation, the future uncertainty of import, and the limited reserves, there exists a strong desire to recover and recycle rare earth elements after their use.

Under these circumstances, researches are being conducted on the recovery of rare earth elements, particularly the method for recovery of cerium oxide. For example, JP-A H11-90825 (Patent Document 1) has disclosed a method for recovering cerium oxide from abrasive waste by the steps of removing impurities by treatment with an alkali metal hydroxide, forming a cake mainly containing cerium oxide with the help of a precipitant, and drying and screening.

Furthermore, JP-A 2002-28662 (Patent Document 2) has disclosed another method including the steps of adding a weak alkaline aqueous solution into abrasive waste used for polishing glass substrates, controlling the zeta potential, and centrifuging the resulting liquid to separate and recover cerium oxide.

In addition, JP-A 2007-276055 (Patent Document 3) has disclosed still another method which employs acid treatment in place of alkali treatment for recovery of cerium oxide from abrasive waste, unlike the above-mentioned method.

SUMMARY OF INVENTION

Technical Problem

However, the method disclosed in Patent Document 1 has the disadvantage of being unable to remove impurities completely from abrasive waste. In other words, the recovered cerium oxide contains metallic elements originating from the precipitant and alkali metal hydroxide as well as substances remaining unremoved in abrasive waste after alkali treatment. Such recycled cerium oxide cannot be used as abrasive in the field involving semiconductors which need to be free of metal impurities and minute defects.

The method disclosed in Patent Document 2 also has the disadvantage of being unable to completely remove inorganic impurities such as $SiO_2$ released from quartz glass substrates by polishing because the amount of alkali added to abrasive waste is very small just enough to change the zeta potential. The cerium oxide recovered in dry state contains residual $SiO_2$ in such a large amount that it cannot be reused as an abrasive for glass substrates.

Further, there is a negative factor that, although the removal of glass constituents from abrasive waste is possible by leaching with the help of hydrofluoric acid, the recovered cerium oxide resulting from separation and drying still contains residual hydrofluoric acid which will roughen the surface of glass substrate by its etching action during polishing. The hydrofluoric acid may be replaced by concentrated nitric acid, with the result that it will dissolve cerium oxide, thereby decreasing the recovery rate. Moreover, the recovered abrasive containing residual hydrofluoric acid is not desirable from the standpoint of safety.

The present invention was completed in view of the foregoing. It is an object of the present invention to provide a method for not only recycling abrasive waste resulting from the polishing of glass substrate but also obtaining recovered abrasive which is composed mainly of cerium oxide and almost completely free of impurities originating from abrasive waste.

Solution to Problem

In order to achieve the foregoing object, the present inventors carried out a series of researches, which led to the findings that it is possible to recover highly pure cerium oxide from abrasive waste (composed mainly of cerium oxide) arising from glass polishing by the procedure involving alkali treatment, precipitation with a precipitant, acid treatment, organic solvent (alcohol) treatment, and drying and that the thus recovered cerium oxide can be reused as an abrasive. The present invention is based on the findings.

The abrasive waste composed mainly of cerium oxide denotes one which contains at least 50 wt %, particularly 50 to 60 wt %, of cerium oxide in terms of solid content. Moreover, the abrasive waste may, besides cerium oxide, additionally contain 10 to 15 wt % of $SiO_2$ (as solids) released from quartz glass substrate by polishing. Incidentally, a virgin abrasive usually contains 55 to 70 wt % of cerium oxide in terms of solid content.

The present invention provides a method for recovery of cerium oxide from the abrasive waste composed mainly of cerium oxide which arises from the polishing of glass substrates, the method comprising the steps of:

(i) adding to the abrasive waste an aqueous solution of a basic substance;

(ii) adding to the resulting solution a precipitant, thereby forming precipitates composed mainly of cerium oxide, and removing the supernatant liquid;

(iii) adding to the resulting precipitates a solution of an acid substance, thereby making the precipitate slightly acid to neutral;

(iv) washing the resulting precipitates with an organic solvent; and (v) drying and crushing the precipitates.

Preferably, the aqueous solution of a basic substance is that of sodium hydroxide having at least pH 12.

The precipitant may be one selected from aluminum sulfate and polyaluminum chloride, the acid substance is one selected from acetic acid, carbonic acid, dilute nitric acid, and dilute hydrochloric acid, and the organic solvent is methanol.

Advantageous Effects of Invention

The method according to the present invention makes it possible to recycle abrasive waste into a pure abrasive composed mainly of cerium oxide which can be reused to polish synthetic quartz glass substrates for state-of-the-art semiconductor technology relating to photomasks and reticles. The recycling of abrasive waste will help stabilize the supply of cerium as a valuable rare earth element.

DESCRIPTION OF EMBODIMENTS

The method for recovery of cerium oxide from the abrasive waste arising from the polishing of glass substrates according to the present invention is intended to recover abrasive composed mainly of cerium oxide. It permits to recover cerium oxide containing few impurities. It achieves its object by sequential treatment of abrasive waste with an alkali, precipitant, acid, and organic solvent.

The procedure for recovery starts with addition of an aqueous solution of a basic substance to abrasive waste. This step is intended to make abrasive waste free of $SiO_2$ and impurities (soluble in a basic aqueous solution) which otherwise would form voids in the precipitates to be produced later.

The basic aqueous solution should be prepared from such base as alkali metal hydroxide, amine, and ammonia, with alkali metal hydroxide being particularly preferable. An aqueous solution of sodium hydroxide or potassium hydroxide which has at least pH 12 is preferable. From the standpoint of treatment of metal substances from the basic aqueous solution, sodium hydroxide is more desirable because sodium can be removed comparatively easily.

The basic substance helps remove $SiO_2$ which is contained in large amounts in abrasive waste left after the polishing of synthetic quartz glass substrates. This $SiO_2$ prevents the sedimentation of solids in abrasive waste. Forced sedimentation with excessive precipitant gives rise to precipitates in the form of hard-to-handle voluminous cake containing a large number of voids.

The basic aqueous solution to be added to abrasive waste should preferably have at least pH 12. In other words, it should have a concentration of 2.0 to 8.0 normal, particularly 2.0 to 4.0 normal, from the standpoint of its ability to dissolve $SiO_2$. With a lower pH value, the basic aqueous solution does not dissolve $SiO_2$ from abrasive waste completely or rapidly. The basic aqueous solution should be added in an amount large enough to dilute abrasive waste 2 to 5 times.

In the next step, a precipitant is added to settle solids which have been treated with the basic aqueous solution. The precipitant includes, for example, aluminum sulfate and polyaluminum chloride. These precipitants are desirable in view of the fact that cerium oxide as abrasive inherently has a small particle diameter, the particles of cerium oxide become smaller due to crushing by polishing, and the particles of cerium oxide have electric charges.

The precipitant should be used in an amount of 0.2 to 1.0 wt %, preferably 0.2 to 0.5 wt %, of the basic aqueous solution containing the abrasive.

With solids settled to form precipitate, the supernatant liquid is removed. In this way it is possible to remove $SiO_2$ from abrasive waste and impurities soluble in the basic aqueous solution.

In addition to the above step, the remaining precipitates should preferably be washed with pure water several times by decantation, so that the solution containing impurities is removed from the precipitates.

Then, the resulting precipitates are treated with a solution of an acid substance so as to make them weakly acidic or neutral. This step is intended to remove residual impurities remaining after treatment with the basic aqueous solution and also to make the precipitates nearly neutral. The acid substance includes, for example, acetic acid, carbonic acid, dilute nitric acid, and dilute hydrochloric acid, each having a concentration of 0.2 to 5.0 normal. The acid treatment should preferably be performed in such a way that the resulting solution which contains the precipitates has a pH value of about 5.5 to 7. The solution with a pH value higher than 7 will weaken the precipitant contained in the precipitates. Conversely, the solution with an excessively low pH value will dissolve cerium oxide, thereby reducing the recovery rate.

The foregoing acid treatment should preferably be followed by decantation with pure water repeated several times, so that the precipitates are freed of solution containing impurities.

Then, the thus obtained precipitates composed mainly of cerium oxide are washed with an organic solvent so that they are freed of residual metal (such as sodium and potassium). The organic solvent should preferably be an hydrophilic one, such as methanol.

Contamination with metal impurities in the abrasive is fatal to the polishing of synthetic quartz glass substrates for photomasks and reticles to be used for fabrication of semiconductors. Therefore, the recovered cerium oxide abrasive should preferably contain as little abrasive-derived metal impurities as possible aside from inevitable metal ions derived from the polishing machine.

The recovered precipitates composed mainly of cerium oxide are subsequently dried at 50 to 80° C. to be made into a cake-like lump. This lump is crushed into powder having a primary particle diameter of 0.5 to 2 μm. The resulting powder can be reused as a cerium oxide-based abrasive. This abrasive should contain cerium oxide (as solids) in an amount at least 50 wt %, particularly 55 to 70 wt %, with the $SiO_2$ content (as solids) being limited to 0.1 to 3.0 wt %, particularly 0.1 to 2.0 wt %.

EXAMPLES

The invention will be described in more detail with reference to the following Examples and Comparative Examples, which are not intended to restrict the scope thereof. Experiments in the Examples were carried out using a virgin abrasive containing 62.1 wt % of cerium oxide (as solids) and abrasive waste containing 54.0 wt % of cerium oxide and 12.0 wt % of $SiO_2$ (both as solids).

Example 1

A sample of abrasive waste (in liquid form) containing cerium oxide, which was collected after the polishing of quartz glass substrates, is prepared. This abrasive waste was diluted three times with aqueous solution (2.0 N) of sodium hydroxide. The resulting liquid was stirred so that the abrasive waste and the basic aqueous solution become thoroughly intimate with each other. The resulting mixture was given aluminum sulfate (0.5 wt %) for precipitation of solids. The supernatant liquid was removed and the remaining solids were washed several times with pure water. With solids existing therein, the pure water was acidified to pH 5.8 with 2.0 N of nitric acid. The solids were washed several times with pure water and finally with methanol. The washed solids were dried to be made into a cake composed mainly of cerium oxide. This cake was crushed into powder having a primary particle diameter of 1 to 1.2 μm. Thus there was obtained a recovered abrasive as desired.

Upon analysis by fluorescent X-ray spectrometry, the recovered abrasive was found to contain 0.5 wt % of $SiO_2$ (as solids). This suggests that the recovered abrasive has almost the same composition as the virgin abrasive composed mainly of cerium oxide.

The recovered abrasive thus obtained was made into an abrasive slurry, which was used for the polishing of quartz glass substrates. The abrasive slurry produced the same effect as the slurry of the virgin abrasive composed mainly of cerium oxide.

Example 2

The same abrasive waste as used in Example 1 was diluted 2.5 times with an aqueous solution (3.5 N) of potassium hydroxide. The resulting liquid was stirred so that the abrasive waste and the basic aqueous solution become thoroughly intimate with each other. The resulting mixture was given polyaluminum chloride (1.0 wt %) for precipitation of solids. The supernatant liquid was removed and the remaining solids were washed several times with pure water. With solids existing therein, the pure water was acidified to pH 6.3 with acetic acid. The solids were washed several times with pure water and finally with methanol. The washed solids were dried to be made into a cake composed mainly of cerium oxide. This cake was crushed into powder having a primary particle diameter of 1 to 1.2 μm. Thus there was obtained a recovered abrasive as desired.

Upon analysis by fluorescent X-ray spectrometry, the recovered abrasive was found to contain 0.3 wt % of $SiO_2$ (as solids). The recovered abrasive thus obtained was used for the polishing of quartz glass substrates. The abrasive slurry produced the same good effect as that in Example 1.

Comparative Example 1

A sample of abrasive waste was diluted three times with pure water in the same way as in Example 1. The resulting liquid was stirred so that the solids were thoroughly dispersed. The resulting mixture was given aluminum sulfate (1.0 wt %) for precipitation of solids. The supernatant liquid was removed and the remaining solids were washed several times with pure water. The washings were found to have pH 6.9. The solids without acid treatment were washed with methanol. The washed solids were dried to be made into a cake, which was subsequently crushed into powder having a primary particle diameter of 1 to 1.2 μm.

Upon analysis by fluorescent X-ray spectrometry, this powder was found to contain 12.3 wt % of $SiO_2$ (as solids). When used as an abrasive for glass polishing, this powder caused chattering to the polishing machine without no good polishing effect.

Comparative Example 2

A sample of abrasive waste was diluted three times with 2 wt % aqueous solution of fluoronitric acid (rich with nitric acid) in the same way as in Example 1. The resulting liquid was stirred so that the solids were thoroughly dispersed. The resulting mixture was given aluminum sulfate (1.0 wt %) for precipitation of solids. The supernatant liquid was removed and the remaining solids were washed several times with pure water. The washings were found to be strongly acid. The solids without pH control such as neutralization were washed with methanol. The washed solids were dried to be made into a cake, which was subsequently crushed into powder having a primary particle diameter of 1 to 1.2 μm.

Upon analysis by fluorescent X-ray spectrometry, this powder was found to contain 0.5 wt % of $SiO_2$ (as solids). However, the content of cerium oxide was only about 50 wt % of that in the virgin abrasive. This poor yield is due to treatment with a strong acid which leaches out cerium oxide. An aqueous slurry of this powder as an abrasive for glass polishing was so strongly acid that it damaged the polishing cloth more rapidly than usual and it was poor in polishing performance.

Japanese Patent Application No. 2011-276669 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for recovery of cerium oxide from an abrasive waste composed mainly of cerium oxide which arises from polishing of glass substrates, said method comprising the steps of:
   (i) adding to the abrasive waste an aqueous solution of a basic substance to form an abrasive waste solution;
   (ii) adding to the abrasive waste solution a precipitant, thereby forming precipitates composed mainly of cerium oxide, and supernatant liquid, and removing the supernatant liquid;
   (iii) adding to the precipitates a solution of an acid substance, thereby making said precipitates have a pH value of about 5.5 to 7, and removing the solution of the acid substance;
   (iv) after removing the solution of the acid substance, washing the precipitates with an organic solvent; and
   (v) after washing the precipitates with the organic solvent, drying and crushing the precipitates.

2. The method for recovery of cerium oxide of claim 1, wherein the aqueous solution of a basic substance is that of sodium hydroxide having at least pH 12.

3. The method for recovery of cerium oxide of claim 1, wherein the precipitant is one selected from aluminum sulfate and polyaluminum chloride.

4. The method for recovery of cerium oxide of claim 1, wherein the acid substance is one selected from acetic acid, carbonic acid, dilute nitric acid, and dilute hydrochloric acid, and the acid substance has a concentration of 0.2 to 5.0 normal.

5. The method for recovery of cerium oxide of claim 1, wherein the organic solvent is methanol.

6. The method for recovery of cerium oxide of claim 1, which produces a recovered abrasive containing cerium oxide as solids in an amount of at least 50 wt % and silicon dioxide as solids in an amount of 0.1 to 3.0 wt %.

* * * * *